United States Patent
Kim et al.

(10) Patent No.: US 11,582,391 B2
(45) Date of Patent: Feb. 14, 2023

(54) ELECTRONIC DEVICE CAPABLE OF CONTROLLING IMAGE DISPLAY EFFECT, AND METHOD FOR DISPLAYING IMAGE

(71) Applicant: Samsung Electronics Co., Ltd., Gyeonggi-do (KR)

(72) Inventors: Chi Sun Kim, Gyeonggi-do (KR); Chang Hyun Chun, Gyeonggi-do (KR); Dong Hyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/640,109

(22) PCT Filed: Aug. 22, 2018

(86) PCT No.: PCT/KR2018/009680
§ 371 (c)(1),
(2) Date: Feb. 19, 2020

(87) PCT Pub. No.: WO2019/039870
PCT Pub. Date: Feb. 28, 2019

(65) Prior Publication Data
US 2021/0136296 A1 May 6, 2021

(30) Foreign Application Priority Data

Aug. 22, 2017 (KR) .................. 10-2017-0106265

(51) Int. Cl.
*H04N 5/232* (2006.01)
*H04N 5/225* (2006.01)
*H04N 5/247* (2006.01)

(52) U.S. Cl.
CPC ...... *H04N 5/232935* (2018.08); *H04N 5/2258* (2013.01); *H04N 5/23229* (2013.01); *H04N 5/247* (2013.01)

(58) Field of Classification Search
CPC ........... H04N 5/232935; H04N 5/2258; H04N 5/23229; H04N 5/247; H04N 13/128;
(Continued)

(56) References Cited

U.S. PATENT DOCUMENTS 8,644,635 B2   2/2014  Han et al.
8,670,046 B2   3/2014  Ohba et al.
(Continued)

FOREIGN PATENT DOCUMENTS

EP   2603003 A2   6/2013
EP   2629537 A2   8/2013
(Continued)

OTHER PUBLICATIONS

European Search Report dated Jun. 25, 2020.
Korean Search Report dated Sep. 29, 2021.

*Primary Examiner* — Timothy J Henn
(74) *Attorney, Agent, or Firm* — Cha & Reiter, LLC

(57) ABSTRACT

An electronic device includes a first camera, a second camera, a display, a memory, and a processor. The processor collects a first image obtained by the first camera with respect to an external object and a second image obtained by the second camera with respect to the external object, generates a third image with respect to the external object using a first area of the first image and a second area of the second image, which corresponds to the first area, identifies an input associated with the third image displayed through the display, and displays an image generated using at least one of the first image, the second image, or depth information in response to the input. The generating operation of the
(Continued)

third image includes generating the depth information with respect to the third image.

9 Claims, 11 Drawing Sheets

(58) Field of Classification Search
CPC .. H04N 13/239; H04N 13/271; H04N 5/2257; H04N 5/265
See application file for complete search history.

(56) References Cited

U.S. PATENT DOCUMENTS

| | | |
|---|---|---|
| 8,780,258 B2 | 7/2014 | Lee |
| 8,810,691 B2 | 8/2014 | Ito et al. |
| 8,811,948 B2 | 8/2014 | Bandyopadhyay et al. |
| 9,047,711 B2 | 6/2015 | Cho et al. |
| 9,154,684 B2 | 10/2015 | Lee et al. |
| 9,241,112 B2 | 1/2016 | Nonaka et al. |
| 9,253,397 B2 | 2/2016 | Lee et al. |
| 9,521,247 B2 | 12/2016 | Bandyopadhyay et al. |
| 9,811,934 B2 | 11/2017 | Kim et al. |
| 9,813,615 B2 | 11/2017 | Lee et al. |
| 9,819,931 B2 | 11/2017 | Lee et al. |
| 10,244,177 B2 | 3/2019 | Lee et al. |
| 10,686,932 B2 | 6/2020 | Bandyopadhyay et al. |
| 2010/0238327 A1* | 9/2010 | Griffith .............. H04N 5/23232 348/240.99 |
| 2011/0234881 A1* | 9/2011 | Wakabayashi ....... H04N 5/2251 348/333.05 |
| 2012/0009896 A1 | 1/2012 | Bandyopadhyay et al. |
| 2012/0057051 A1 | 3/2012 | Ito et al. |
| 2012/0063697 A1 | 3/2012 | Han et al. |
| 2012/0105590 A1* | 5/2012 | Fukumoto ........ H04N 5/232939 348/46 |
| 2012/0281119 A1 | 11/2012 | Ohba et al. |
| 2013/0088614 A1 | 4/2013 | Lee |
| 2013/0141435 A1 | 6/2013 | Cho et al. |
| 2013/0215225 A1 | 8/2013 | Yun et al. |
| 2014/0132735 A1 | 5/2014 | Lee et al. |
| 2014/0320701 A1 | 10/2014 | Nonaka et al. |
| 2015/0050916 A1 | 2/2015 | Bandyopadhyay et al. |
| 2016/0028949 A1* | 1/2016 | Lee .................... H04N 5/23232 348/218.1 |
| 2016/0054890 A1* | 2/2016 | Kim ........................ G06T 19/20 715/852 |
| 2016/0127645 A1* | 5/2016 | Sudo ................ H04N 5/232941 348/221.1 |
| 2016/0225175 A1 | 8/2016 | Kim et al. |
| 2016/0381289 A1* | 12/2016 | Kim ................... H04N 5/23222 348/38 |
| 2017/0048461 A1 | 2/2017 | Lee et al. |
| 2017/0070606 A1 | 3/2017 | Bandyopadhyay et al. |
| 2017/0150067 A1* | 5/2017 | Han ..................... H04N 5/2351 |
| 2018/0041748 A1 | 2/2018 | Lee et al. |
| 2018/0160046 A1* | 6/2018 | Nash ................ H04N 5/232935 |
| 2018/0227478 A1* | 8/2018 | Li ....................... H04N 5/23212 |
| 2018/0249090 A1* | 8/2018 | Nakagawa ............... G09G 5/00 |
| 2018/0288397 A1* | 10/2018 | Lee ........................... G06T 3/40 |

FOREIGN PATENT DOCUMENTS

| | | |
|---|---|---|
| JP | 2011-114401 A | 6/2011 |
| KR | 10-2007-0097638 A | 10/2007 |
| KR | 10-2011-0082736 A | 7/2011 |
| KR | 10-2012-0027712 A | 3/2012 |
| KR | 10-2013-0038076 A | 4/2013 |
| KR | 10-2014-0062801 A | 5/2014 |
| KR | 10-2014-0066059 A | 5/2014 |
| KR | 10-2015-0000655 A | 1/2015 |
| KR | 10-1480626 B1 | 1/2015 |
| KR | 10-2015-0031721 A | 3/2015 |
| KR | 10-1633342 B1 | 6/2016 |
| KR | 10-2016-0096989 A | 8/2016 |
| KR | 10-2016-0149641 A | 12/2016 |
| WO | 2016/013902 A1 | 1/2016 |

\* cited by examiner

ELECTRONIC DEVICE CAPABLE OF CONTROLLING IMAGE DISPLAY EFFECT, AND METHOD FOR DISPLAYING IMAGE

CROSS REFERENCE TO RELATED APPLICATIONS

This application is a National Phase Entry of PCT International Application No. PCT/KR2018/009680, which was filed on Aug. 22, 2018, and claims a priority to Korean Patent Application No. 10-2017-0106265, which was filed on Aug. 22, 2017, the contents of which are incorporated herein by reference.

TECHNICAL FIELD

The present disclosure relates to an electronic device capable of controlling an image display effect and a method for displaying an image.

BACKGROUND ART

Electronic devices like a smartphone, a tablet PC, etc., include a camera module. The camera module collects image data using a lens, an image sensor, and the like. The collected image data are stored in a memory inside the electronic device or displayed through a display.

In recent years, electronic devices equipped with a multi-camera, such as a dual-camera, have been introduced. The dual-camera collects the image data respectively through two camera modules placed at a certain distance from each other. The camera modules collect the image data for the same subject at different angles and different settings. The electronic device equipped with the dual-camera combines images captured from different angles to generate an image having characteristics (e.g., a high resolution, wide viewing angle, or three-dimensional photograph) different from those of an image generated by a single-camera.

DISCLOSURE

Technical Problem

The electronic device including the dual-camera according to a conventional technology generates two images with different viewing angles based on the image data respectively collected by the camera modules and stores the generated two images. When a user wants to view the images taken, there is an inconvenience that the user needs to view each image individually through a gallery app.

In addition, according to the electronic device including the dual-camera according to the conventional technology, it is difficult to switch between the two images with different viewing angles, and it is not easy to apply a depth effect desired by the user.

Technical Solution

Accordingly, an aspect of the present disclosure is to provide an electronic device allowing the user to apply the depth effect, which is generated due to a difference in viewing angle between the camera modules, in real time when displaying a preview image or a stored image.

In accordance with an aspect of the present disclosure, an electronic device includes a first camera having a first angle of view, a second camera having a second angle of view, a display, a memory, and a processor. The processor collects a first image obtained by the first camera with respect to an external object and a second image obtained by the second camera with respect to the external object, generates a third image with respect to the external object using a first area of the first image and a second area of the second image, which corresponds to the first area, identifies an input displayed through the display and associated with the third image, and displays an image generated using at least one of the first image, the second image, or depth information in response to the input. The generating of the third image includes generating the depth information with respect to the third image.

Advantageous Effects

According to various embodiments of the present disclosure, the electronic device and the image displaying method may provide a user interface to allow the user to control the depth effect in the process of displaying the preview image using the plural images taken by the multi-camera and having different angle of views from each other.

According to various embodiments of the present disclosure, the electronic device and the image displaying method may store the image data taken by the multi-camera together with the depth information and may provide the image conversion effect using the stored depth information.

MODE FOR INVENTION

Figure 1:
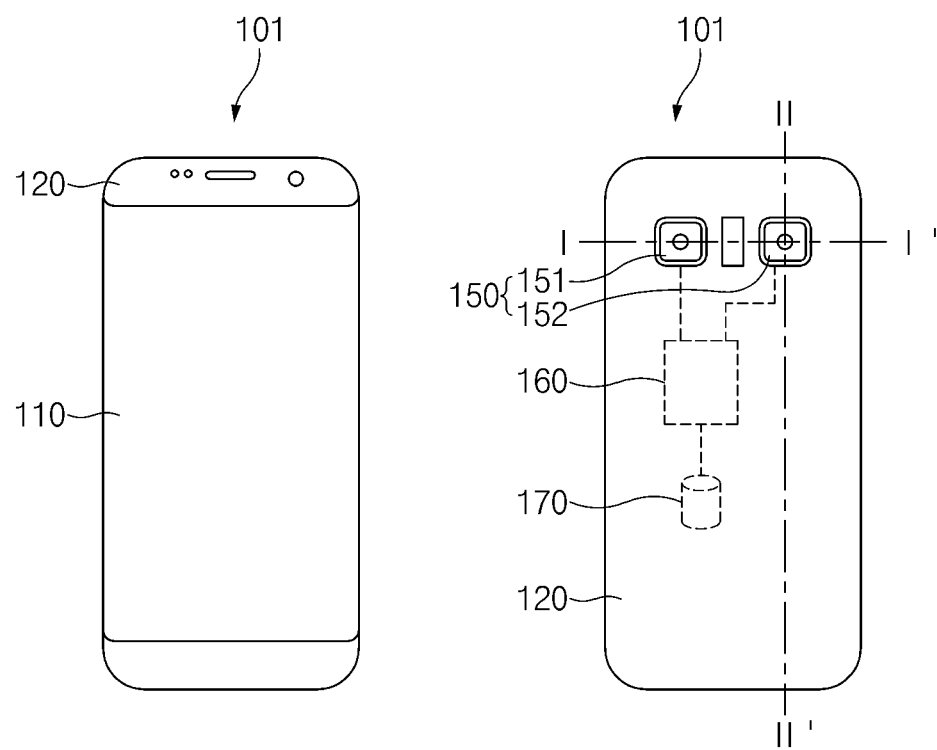
FIG. 1 is a view showing an electronic device including a multi-camera according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include"

and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smart-phones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HIMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a view showing an electronic device 101 including a multi-camera 150 according to various embodiments. FIG. 1 shows a dual-camera as a representative example, however, the multi-camera should not be limited to the dual-camera.

Referring to FIG. 1, the electronic device 101 may include a display 110, a housing 120, and the multi-camera 150, which are arranged on the outside thereof. The electronic device 101 may further include a button, a sensor, a microphone, and the like. The electronic device 101 may further include a processor (or a controller) 160 for controlling the multi-camera 150 and a memory 170 for storing an image inside the housing 120.

The display 110 may output various contents (e.g., an image or a text) provided to a user. The display 110 may receive a user's input through a touch input interface. According to an embodiment, the display 110 may output a preview image based on image data collected by the multi-camera 150. For example, the user may run a camera application and may view the preview image output through the display 110 in real time while taking a photograph or a video image.

The housing (or a main body) 120 may be equipped with the display 110, the multi-camera 150, and the button, which are arranged on the outside thereof. The housing 120 may be equipped with the processor 160, the memory 170, a module, a sensor, a circuit board, and the like, which are arranged in the housing 120 to drive the electronic device 101. FIG. 1 shows an example in which the multi-camera 150 is mounted on a rear surface (i.e., a surface opposite to a surface on which the display 110 is mounted) of the housing 120, but it should not be limited thereto or thereby. For example, the multi-camera 150 may be mounted on a front surface (i.e., the surface on which the display 110 is mounted) of the housing 120.

The multi-camera 150 may include a plurality of camera modules. Hereinafter, an example in which the multi-camera 150 includes a first camera (or a first camera module) 151 and a second camera (or a second camera module) 152 will be mainly described, but the multi-camera 150 should not be limited thereto or thereby.

The first camera 151 and the second camera 152 may be arranged to maintain a specified distance (e.g., about 2 cm)

therebetween. FIG. 1 shows the first camera 151 and the second camera 152 arranged along an axis I-I' as a representative example, but they should not be limited thereto or thereby. For example, the first camera 151 and the second camera 152 may be arranged along an axis II-II' substantially vertical to the axis I-I'.

According to various embodiments, the first camera 151 and the second camera 152 may have different operating characteristics from each other. According to an embodiment, the first camera 151 may include a telephoto lens and may be suitable for shooting a long-distance subject. The second camera 152 may include a wide-angle lens and may be suitable for shooting a short-distance subject.

For example, the first camera 151 and the second camera 152 may have different focal lengths from each other and different angle of views (or "field of view (FOV)") from each other. The first camera 151 may have a relatively long first focal length and a first angle of view with a relatively narrow range (or relatively narrow angle). The second camera 152 may have a relatively short second focal length and a second angle of view with a relatively wide range (or relatively wide angle). The first focal length may be longer than the second focal length, and the second angle of view may be wider than the first angle of view.

Hereinafter, an example in which the first camera 151 includes the telephoto lens and the second camera 152 includes the wide-angle lens will be mainly described, but the first and second cameras 151 and 152 should not be limited thereto or thereby.

According to various embodiments, the first camera 151 and the second camera 152 may be substantially simultaneously operated and may output the preview image. For example, when the user runs the camera application, the first camera 151 and the second camera 152 may be substantially simultaneously operated and may collect the image data, respectively. The preview image may be output through the display 110 based on the image data collected by one of the first camera 151 and the second camera 152.

According to various embodiments, in a case that the user presses a shooting button displayed on the display 110, the processor 160 may store the image data collected by each of the first camera 151 and the second camera 152. The image data collected by each of the first camera 151 and the second camera 152 may have different image characteristics from each other depending on characteristics, such as a lens, an image sensor, a shoot-setting value, etc. For example, the image data (hereinafter, referred to as "first image data") taken by the first camera 151 may be an image with the relatively narrow angle of view (or "field of view (FOV)"). The image data (hereinafter, referred to as "second image data") taken by the second camera 152 may be an image with the relatively wide angle of view (or "field of view (FOV)"). The angle of view of the first camera 151 may be included in the angle of view of the second camera 152.

The processor (or a controller or an image processor) 160 may control the first camera 151 and the second camera 152. The processor 160 may process the image data collected by the first camera 151 and the second camera 152 or may store the image data in the memory 170.

According to various embodiments, the processor 160 may store the image data collected by the first camera 151 and the second camera 152 to be associated with each other or in one file structure. For example, the first image data collected by the first camera 151 and the second image data collected by the second camera 152 may be stored in the memory 170 as one Samsung Extended Format (SEF) file. The first image data and the second image data may be stored together with shooting information (e.g., shooting date/time, shooting location, shoot-setting value, or the like). The first image data and the second image data may be structured via metadata.

According to various embodiments, the processor 160 may store the first image data collected by the first camera 151 and the second image data collected by the second camera 152 with depth information (or depth map) as one file. The depth information may be calculated based on a difference value between the first image data and the second image data and the distance between the first camera 151 and the second camera 152.

According to an embodiment, the processor 160 may set one of a first image based on the first image data and a second image based on the second image data as a representative image. For example, the processor 160 may set the first image taken by the first camera 151 as the representative image by default. The set representative image may be output through the display 110 by a default setting in the gallery app. Another image (hereinafter, referred to as "hidden image") other than the representative image may be output through the display when there is a separate user request.

Figure 2:
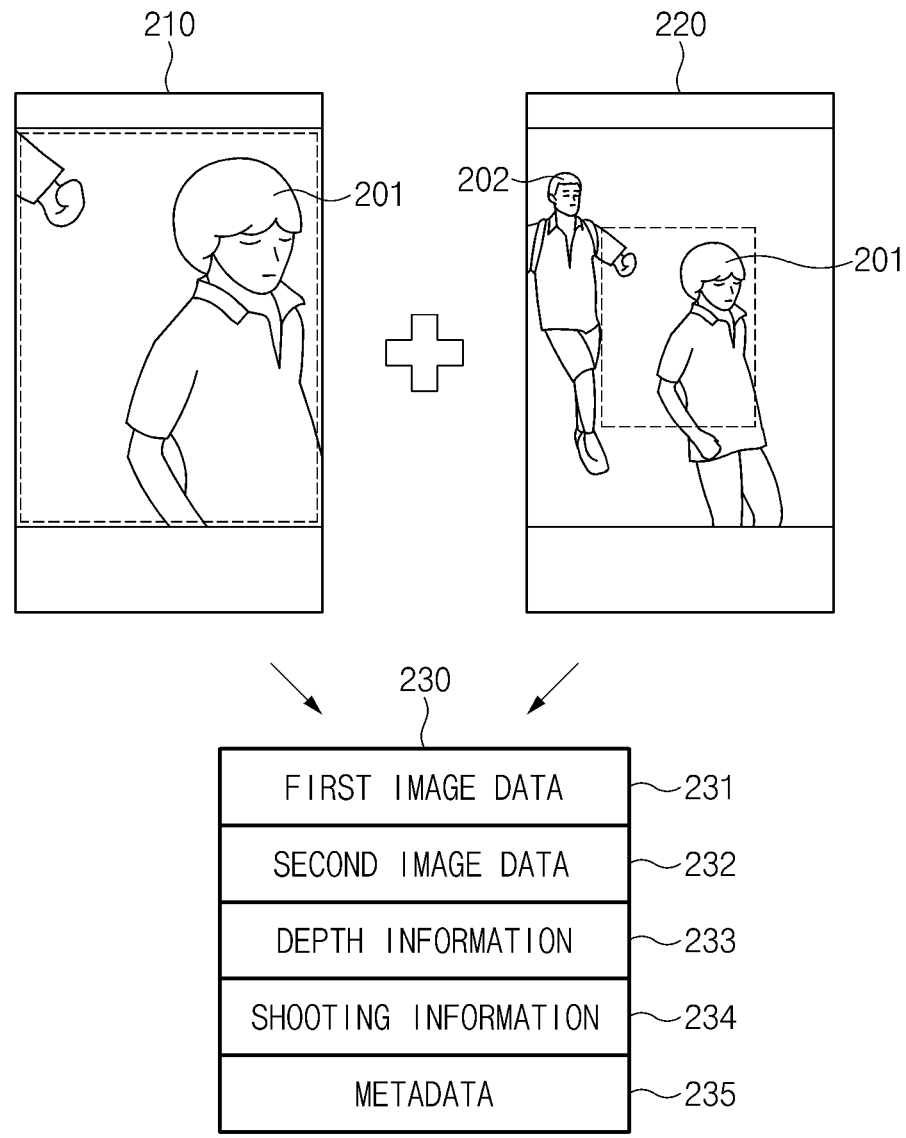
FIG. 2 is a view showing an image shooting and storing operation for an image using a dual-camera according to various embodiments.

FIG. 2 is a view showing an image shooting and storing operation using the dual-camera according to various embodiments.

Referring to FIG. 2, the electronic device 101 may collect the image data with respect to an external object using the first camera 151 (e.g., a telephoto camera) and the second camera 152 (e.g., a wide-angle camera). For example, the first camera 151 may include the telephoto lens and may be suitable for shooting the long-distance subject. The second camera 152 may include the wide-angle lens and may be suitable for shooting the short-distance subject.

The angle of view of the first image 210 taken by the first camera 151 may be narrower than the angle of view of the second image 220 taken by the second camera 152. For example, the first image 210 may have the angle of view with a focused object 201 as its center. Different from the first image 210, the second image 220 may have the relatively wide angle of view including the object 201 and another background object 202 around the object 201.

According to various embodiments, the processor 160 may output one of the first image 210 and the second image 220 as the preview image displayed through the display 110 in a process of shooting photos or video images. For example, the processor 160 may allow the preview image to be output based on the image data collected by the first camera 151 including the telephoto lens. In this case, the processor 160 may continue to collect the image data through the second camera 152 including the wide-angle lens and may be in a standby state for the shooting.

According to various embodiments, the processor 160 may extract the depth information based on the image data respectively collected by the cameras. The depth information may be calculated based on the difference value between the first image data and the second image data and the distance between the first camera 151 and the second camera 152. For example, the processor 160 may extract the depth information based on a data difference value (e.g., a background compression effect due to lens characteristics) caused by the difference in angle of view between the first camera 151 and the second camera 152 and a data difference value (e.g., disparity and parallax) caused by a difference in distance between the first camera 151 and the second camera 152. The processor 160 may blur (or out-focus) an area (e.g., the background object 202) except for the object 201 based on the extracted depth information while the preview image is output. As another way, the processor 160 may output a user interface with an adjustable blur processing level on the area except for the object 201. The user may adjust a depth effect in real time using the user interface. Additional information about the depth adjustment in the preview image will be provided with reference to FIGS. 3, 4a, and 4b.

According to various embodiments, when a shooting input occurs while the preview image is being output, the processor 160 may store the image data at a time point at which the shooting input occurs. For example, when the user presses a shutter button displayed through the display 110, the processor 160 may store the image data collected by the first camera 151 and the second camera 152 at the time point in the memory.

According to various embodiments, the processor 160 may store the image data of the first image 210 taken by the first camera 151 and the image data of the second image 220 taken by the second camera 152 as one extended image file 230 such that the image data of the first image 210 are linked with the image data of the second image 220.

The image file 230 may include the first image data 231, the second image data 232, the depth information 233, the shooting information 234, and the metadata 235.

The first image data 231 may be image data recorded in the image sensor of the first camera 151 at the time point at which the shooting input occurs. The processor 160 may read-out the image sensor of the first camera 151 to form the first image 210.

The second image data 232 may be image data recorded in the image sensor of the second camera 152 at the time point at which the shooting input occurs. The processor 160 may read-out the image sensor of the second camera 152 to form the second image 220.

The depth information 233 may be calculated based on the difference value between the first image data 231 and the second image data 232 and the distance between the first camera 151 and the second camera 152.

The shooting information 234 may include the shooting date/time, the shooting location, the shoot-setting value, or the like. For example, the shoot-setting value may include an aperture value (e.g., f number), a lens' focal length, a white balance value, or sensitivity of a sensor (e.g., ISO setting) of each camera.

The metadata 235 may be data used to associate the first image data 231, the second image data 232, the depth information 233, and the shooting information 234 with each other.

Figure 3:
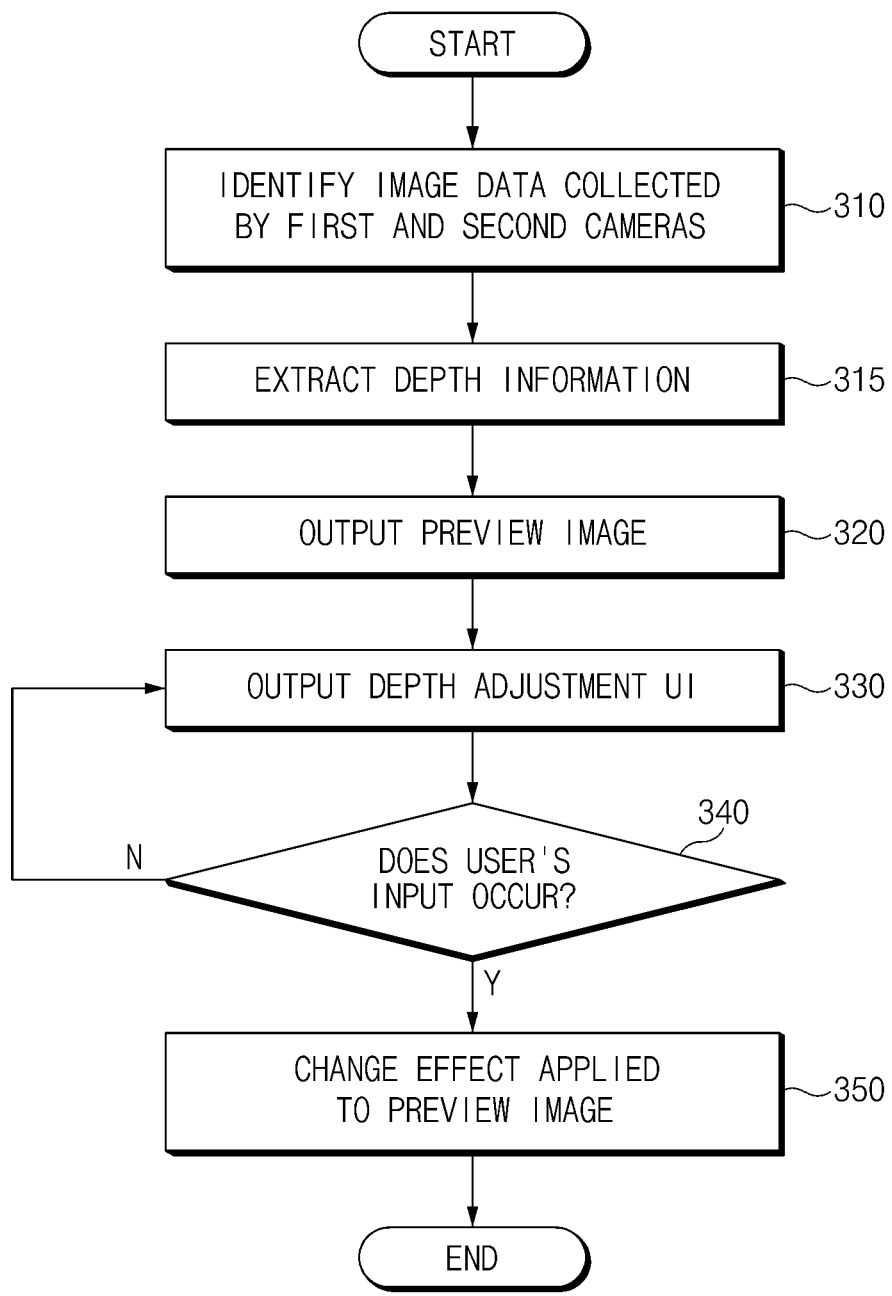
FIG. 3 is a flowchart showing a method for displaying an image in a preview state according to various embodiments.

FIG. 3 is a flowchart showing a method for displaying an image in a preview state according to various embodiments.

Referring to FIG. 3, the processor 160 may operate the first camera 151 and the second camera 152 in operation 310. Each of the first camera 151 and the second camera 152 may be in a state that collects the image data using the image sensor provided therein.

In operation 315, the processor 160 may extract the depth information based on the image data collected by the first camera 151 and the second camera 152. The processor 160 may extract the depth information with respect to all frames or in a predetermined frame unit.

In operation 320, the processor 160 may output the preview image. According to an embodiment, the preview image may be output using the first image data collected by the first camera 151. According to another embodiment, the preview image may be output using the second image data collected by the second camera 152. According to another embodiment, the preview image may be output using third image data obtained by combining a portion of the first image data and a portion of the second image data.

In operation 330, the processor 160 may output the user interface (hereinafter, referred to as "depth adjustment UI") for the depth adjustment. The depth adjustment UI may be an UI to change the preview image (or to apply various effects) using the extracted depth information. For example, the depth adjustment UI may have a bar shape of which indicator (not shown) is movable. As another example, the depth adjustment UI may be provided in a button shape of selecting one of various setting values or in the form of entering a numeric value.

In operation 340, the processor 160 may identify whether the user's input occurs through the depth adjustment UI. For example, when the depth adjustment UI is the bar shape of which indicator (not shown) is movable, the user's input may be a touch input to move the bar.

In operation 350, when the user's input occurs through the depth adjustment UI, the processor 160 may change the effect applied to the preview image in response to the user's input. For example, the processor 160 may blur at least a portion of the preview image based on the user's input and the depth information. The processor 160 may blur a second area with a depth different from that of a first area having a user-defined depth based on the user's input. In this case, a value of the blur process may become high in an area of the second area, which has a relatively large depth difference with respect to the first area.

According to various embodiments, when the shooting input (e.g., shutter button touch) occurs while the preview image is being output, the processor 160 may store the image data at the time point at which the shooting input occurs. The processor 160 may store the first image data collected by the first camera 151 and the second image data collected by the second camera 152 as one extended image file to be associated with each other.

Figure 4A:
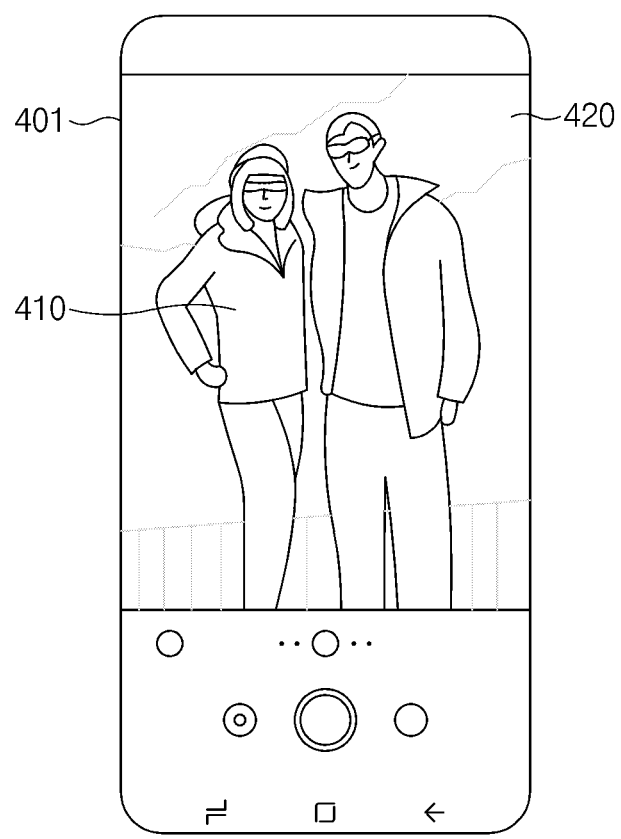
FIGS. 4a and 4b are views showing examples of preview images according to various embodiments.
Figure 4B:
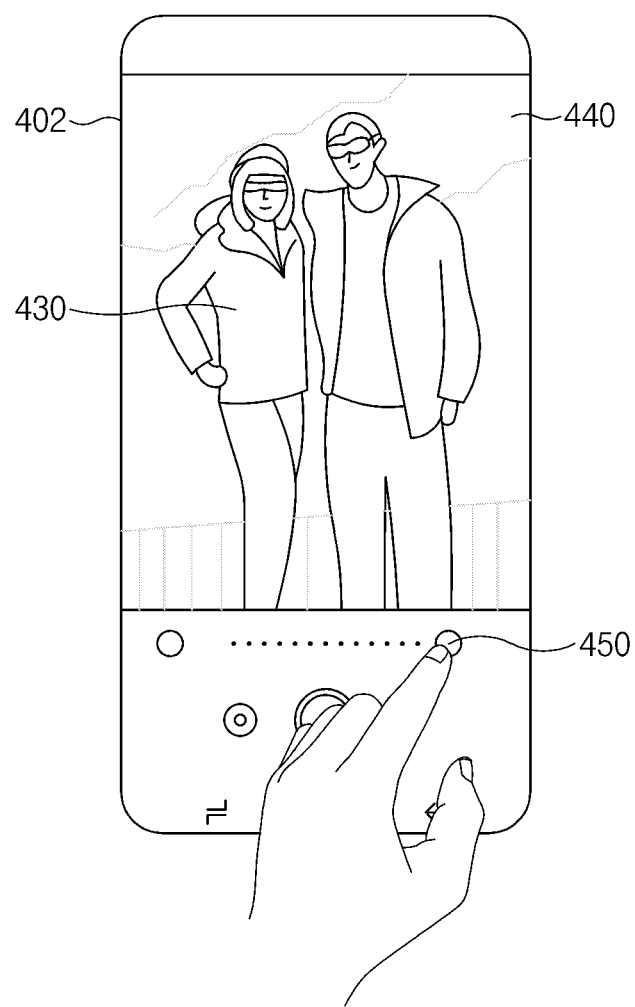

FIGS. 4a and 4b are views showing examples of preview images according to various embodiments.

Referring to FIG. 4a, when the camera app runs, the processor 160 may output a preview image 401 to the display. The preview image 401 may be output using the first image data collected by the first camera 151 or using the second image data collected by the second camera 152. According to an embodiment, the preview image 401 may be output using the third image data obtained by combining the portion of the first image data and the portion of the second image data.

According to various embodiments, the processor 160 may extract the depth information using the first image data and the second image data. The processor 160 may blur at least a portion of the preview image 401 using the extracted depth information in accordance with a predetermined setting value. The processor 160 may blur a remaining background area 420 based on the depth information except for a focused object 410.

For example, when the short-distance object 410 is taken in a state where the focal length of the first camera 151 and the focal length of the second camera 152 are twice different, the processor 160 may output a vivid image in an AF area centered on the object 410 and may apply a blur effect (out-focus effect) to the background area 420 such that the image is blurred. Thus, the processor 160 may provide an effect in which the image of a person whom the user wants to take a photo is output clearly and the surrounding background is blurred in a preview state.

Referring to FIG. 4b, when the camera app runs, the processor 160 may output a preview image 402 to the display. The preview image 402 may be output using the first image data collected by the first camera 151 or using the second image data collected by the second camera 152. The processor 160 may extract the depth information using the first image data and the second image data.

According to various embodiments, the processor 160 may output the depth adjustment UI (e.g., Live Focus) 450 together with the preview image 402. For example, the depth adjustment UI 450 may be provided in a bar shape of which indicator (not shown) is movable by the touch input.

When the user's input occurs through the depth adjustment UI 450, the processor 160 may blur at least a portion of the preview image 402 based on the extracted depth information and the user's input.

The processor 160 may output a vivid image in an AF area centered on an object 430 and may apply the blur effect (out-focus effect) to a background area 440 to blur the background area. When a movement distance in the bar by the user's input is long, the processor 160 may increase a blur processing value. When the movement distance in the bar by the user's input is short, the processor 160 may decrease the blur processing value.

Figure 5:
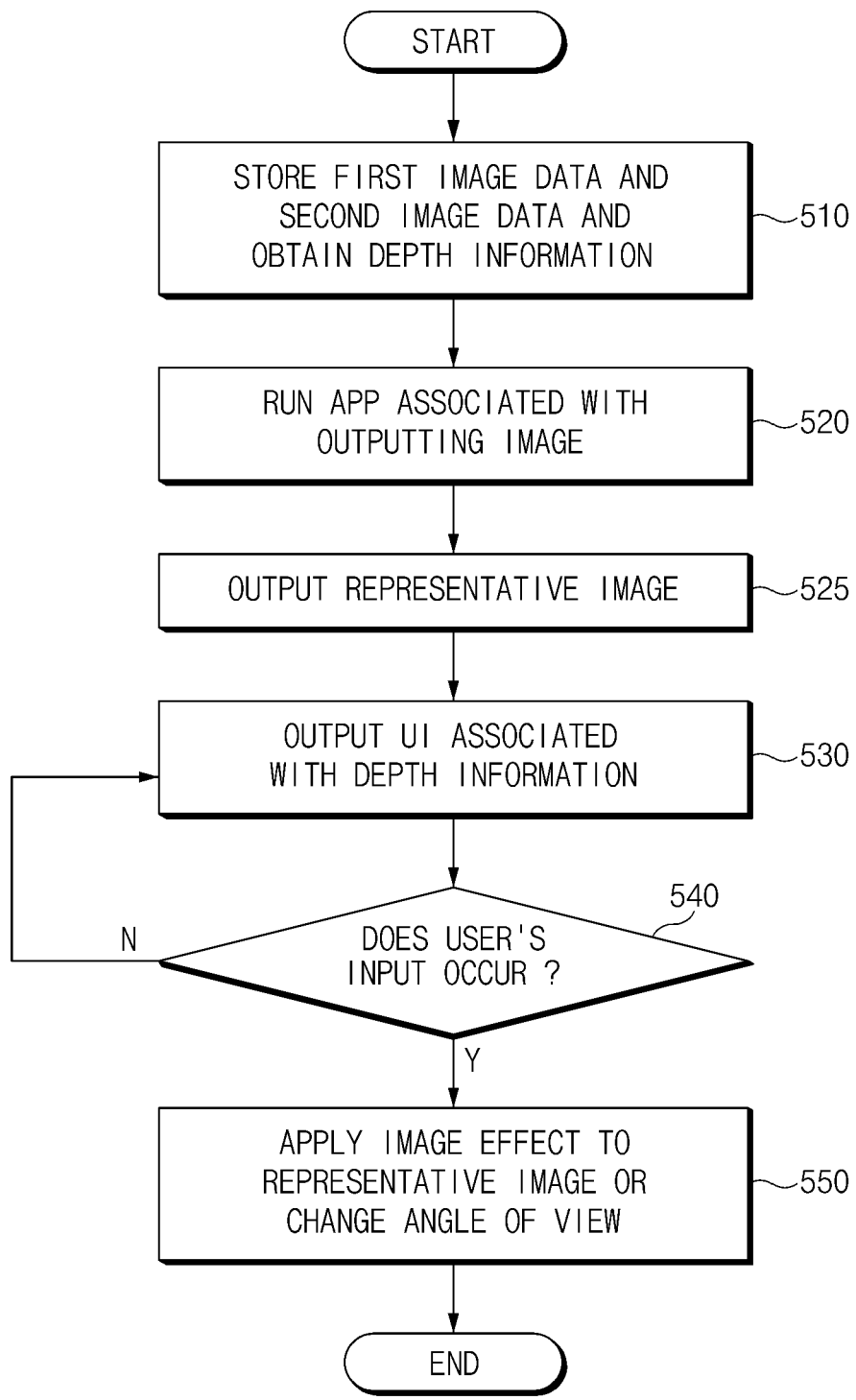
FIG. 5 is a flowchart showing a method for displaying a stored image according to various embodiments.

FIG. 5 is a flowchart showing a method for displaying a stored image according to various embodiments.

Referring to FIG. 5, the processor 160 may substantially simultaneously store the first image data collected by the first camera 151 and the second image data collected by the second camera 152 in response to the shooting input (e.g., the shutter button touch) in operation 510. The first image data and the second image data may be stored to be associated with each other.

The processor 160 may extract the depth information using the first image data collected by the first camera 151 and the second image data collected by the second camera 152. In an embodiment, the processor 160 may store the extracted depth information together with the first image data and the second image data as one file.

In operation 520, the processor 160 may run an app associated with the output of the image. For example, the gallery app may run in response to the user's input. As another example, when the shooting is finished, the gallery app may be run automatically.

In operation 525, the processor 160 may output a representative image based on one of the stored first and second image data. For example, the representative image may be output right after the gallery app runs or when the user selects a thumbnail image.

According to an embodiment, the representative image may be output using the first image data collected by the first camera 151. According to another embodiment, the representative image may be output using the second image data collected by the second camera 152. According to another embodiment, the representative image may be output using the third image data obtained by combining the portion of the first image data and the portion of the second image data.

In operation 530, the processor 160 may output a UI (e.g., a depth adjustment UI or an angle change UI) associated with the depth information. For example, the UI associated with the depth information may include the depth adjustment UI or the angle change UI. The depth adjustment UI may be a UI to change the representative image (or to apply various effects) using the extracted depth information (refer to FIG. 6A). The angle change UI may be a UI to change the angle of view of the representative image in accordance with the user's input (refer to FIG. 6B).

In operation 540, the processor 160 may identify whether the user's input occurs through the UI (the depth adjustment UI or the angle change UI) associated with the depth information.

In operation 550, the processor 160 may apply various effects to the representative image or may change the angle of view based on the user's input and the stored depth information. For instance, the processor 160 may blur a peripheral area of a focused area based on the user's input and the depth information. As another example, the processor 160 may enlarge or narrow the angle of view of the representative image based on the user's input and the depth information.

The image displaying method according to various embodiments may be executed by an electronic device (e.g., the electronic device 101 shown in FIG. 1 or an electronic device 2001 shown in FIG. 8) and may include identifying the first image with respect to the external object, which is obtained by the first camera of the electronic device, and the second image with respect to the external object, which is obtained by the second camera of the electronic device, generating the third image with respect to the external object using the first area including at least the portion of the first image and the second area of the second image corresponding to the first area, generating the depth information with respect to the third image, identifying the input associated with the third image displayed through the display of the electronic device, and selectively displaying the image corresponding to the input using at least one of the first image, the second image, or the depth information in response to the input.

The operation of identifying the input may include receiving an input associated with the depth adjustment with respect to the third image as at least a portion of the input, and the operation of selectively displaying the image may include determining a blur level corresponding to the input and performing the blur process depending on the determined blurring level.

The image processing method according to various embodiments may further include receiving a shooting signal with respect to the shooting for the external object, obtaining the first image using the first camera in response to the signal, and obtaining the second image using the second camera in response to the signal. The image processing method may further include storing the first image and the second image in one file.

Figure 6A:
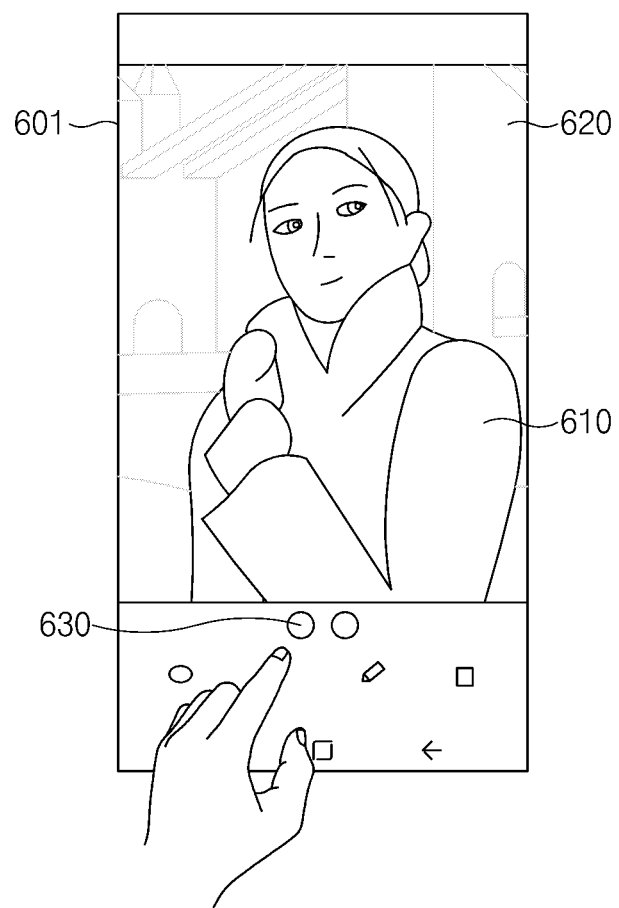
FIG. 6a is a view showing an example of a depth adjustment user interface for the stored image according to various embodiments.

FIG. 6a is a view showing an example of a depth adjustment user interface for the stored image according to various embodiments.

Referring to FIG. 6A, the processor 160 may output a representative image 601 of an image file stored in the memory thereof either automatically or in response to the user's input. The image file may include the first image data collected by the first camera 151, the second image data collected by the second camera 152, the depth information, shooting environment information, the metadata, or the like.

For example, when the gallery app runs according to the user's input, a thumbnail image of the representative image 601 stored in the memory may be output. When the user selects one of the thumbnail images, the representative image 601 associated with the selected thumbnail image may be output. As another example, when the shooting by the first camera 151 and the second camera 152 is finished, the representative image 601 of a most-recently stored image file may be automatically output.

According to an embodiment, the representative image 601 may be output using the first image data collected by the first camera 151. According to another embodiment, the representative image 601 may be output using the second image data collected by the second camera 152. According to another embodiment, the representative image 601 may be output using the third image data obtained by combining the portion of the first image data and the portion of the second image data. The hidden image, which is included in the same image file as the representative image but not the representative image, may not be output unless there is the separate user request.

The processor 160 may output a depth adjustment UI 630 in a button shape together with the representative image 601. The user may control the depth adjustment UI 630 to maintain a focused object 610 clear and to apply a blur effect to a surrounding background 620.

When the user's input occurs through the depth adjustment UI 630, the processor 160 may apply the blur effect to each pixel (or each pixel area) of the representative image 601 by reflecting the stored depth information and the user input value. In an embodiment, the processor 160 may store the image to which the blur effect is applied as a separate file when there is a separate user's request.

Figure 6B:
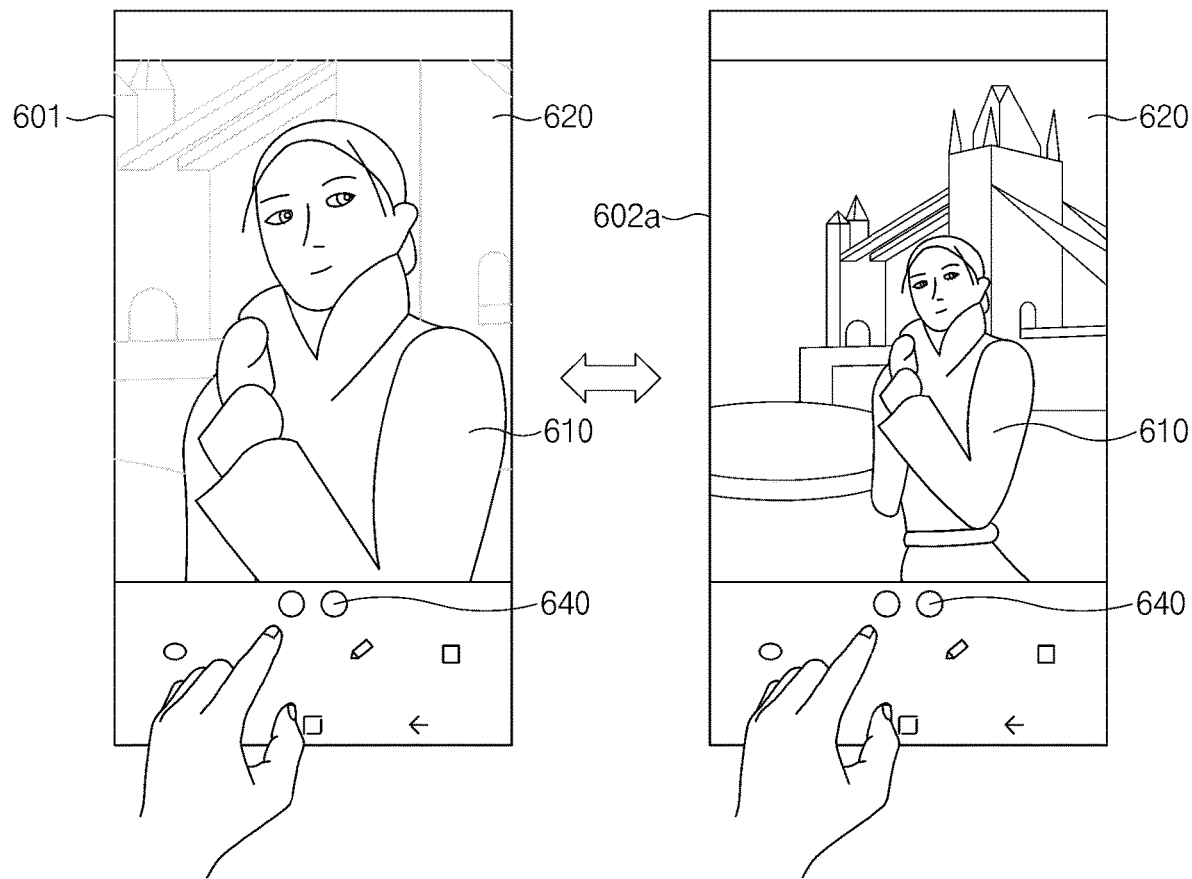
FIG. 6b is a view showing an example of the depth adjustment user interface in a gallery app according to various embodiments.

FIG. 6b is a view showing an example of the depth adjustment user interface in a gallery app according to various embodiments.

Referring to FIG. 6B, the processor 160 may output a representative image 602 of an image file stored in the memory thereof either automatically or in response to the user's input. The representative image 602 may be output using the first image data collected by the first camera 151 or using the second image data collected by the second camera 152.

The processor 160 may output an angle change UI 640 in a button shape together with the representative image 602. The user may control the angle change UI 640 to change an angle of view of the representative image 602. The processor 160 may change the angle of view of the representative image 602 based on the depth information and the user's input.

For example, when the user's input requesting a large angle of view occurs through the angle change UI 640, the processor 160 may display a representative image 602a obtained by enlarging a surrounding background 620 of the representative image 602. In this case, a rate of the focused object 610 in the representative image 602a may decrease, and a rate of the surrounding background 620 in the representative image 602a may increase. The representative image 602 may be converted to a hidden image stored therewith according to the user's input. According to an embodiment, the processor 160 may store the image with the changed angle of view as a separate file when the user's request separately occurs.

Figure 7:
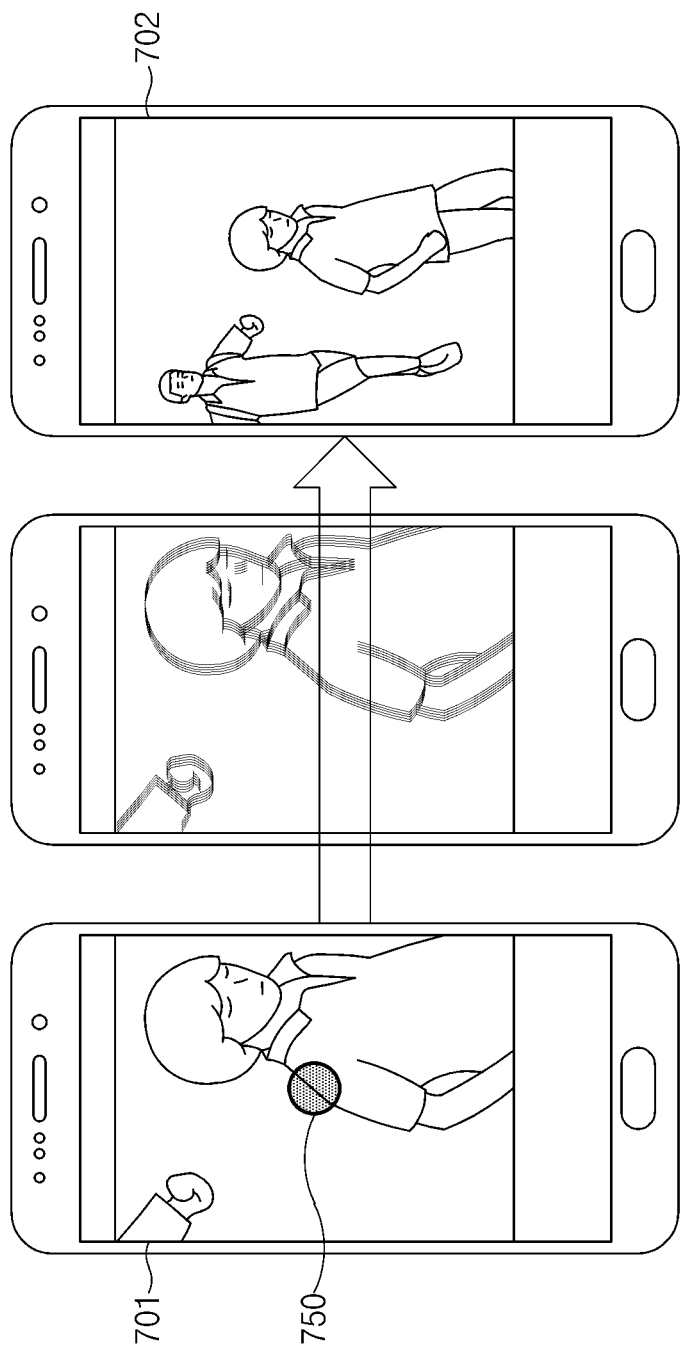
FIG. 7 is a view showing an example of an image change effect according to various embodiments.

FIG. 7 is a view showing an example of an image change effect according to various embodiments.

Referring to FIG. 7, the processor 160 may output a representative image 701 of an image file stored in the memory thereof either automatically or in response to the user's input. The image file may include the first image data collected by the first camera 151, the second image data collected by the second camera 152, the depth information, the shooting environment information, the metadata, or the like.

According to various embodiments, the processor 160 may apply an animation effect to a process of converting the representative image 701 to a hidden image 702. For example, when a predetermined user's input (e.g., a force touch, a long touch, a double tap, etc.) 750 occurs in the representative image 701, the processor 160 may convert the representative image 701 to the hidden image 702 using stored information (e.g., the depth information) or information (e.g., an animation effect duration, an animation effect type, etc.) selected by the user. The processor 160 may sequentially apply a conversion effect (animation effect) in accordance with the stored information (e.g., the depth information) or the information selected by the user while converting the representative image 701 to the hidden image 702. For example, the processor 160 may allow the hidden image 702 to be displayed after a process in which the depth information begins to appear further from a portion near a main subject while displaying the representative image 701. Further, when converting the representative image 701 to the hidden image 702, the processor 160 may apply the animation conversion effect to convert the representative image 701 to the hidden image 702.

According to an embodiment, the processor 160 may store the conversion process as a video file or an image file (e.g., GIF). The processor 160 may transmit the generated video image file and the image file to which the animation effect is applied to an external device or may share the generated video file and the image file to which the animation effect is applied with other users' devices.

Figure 8:
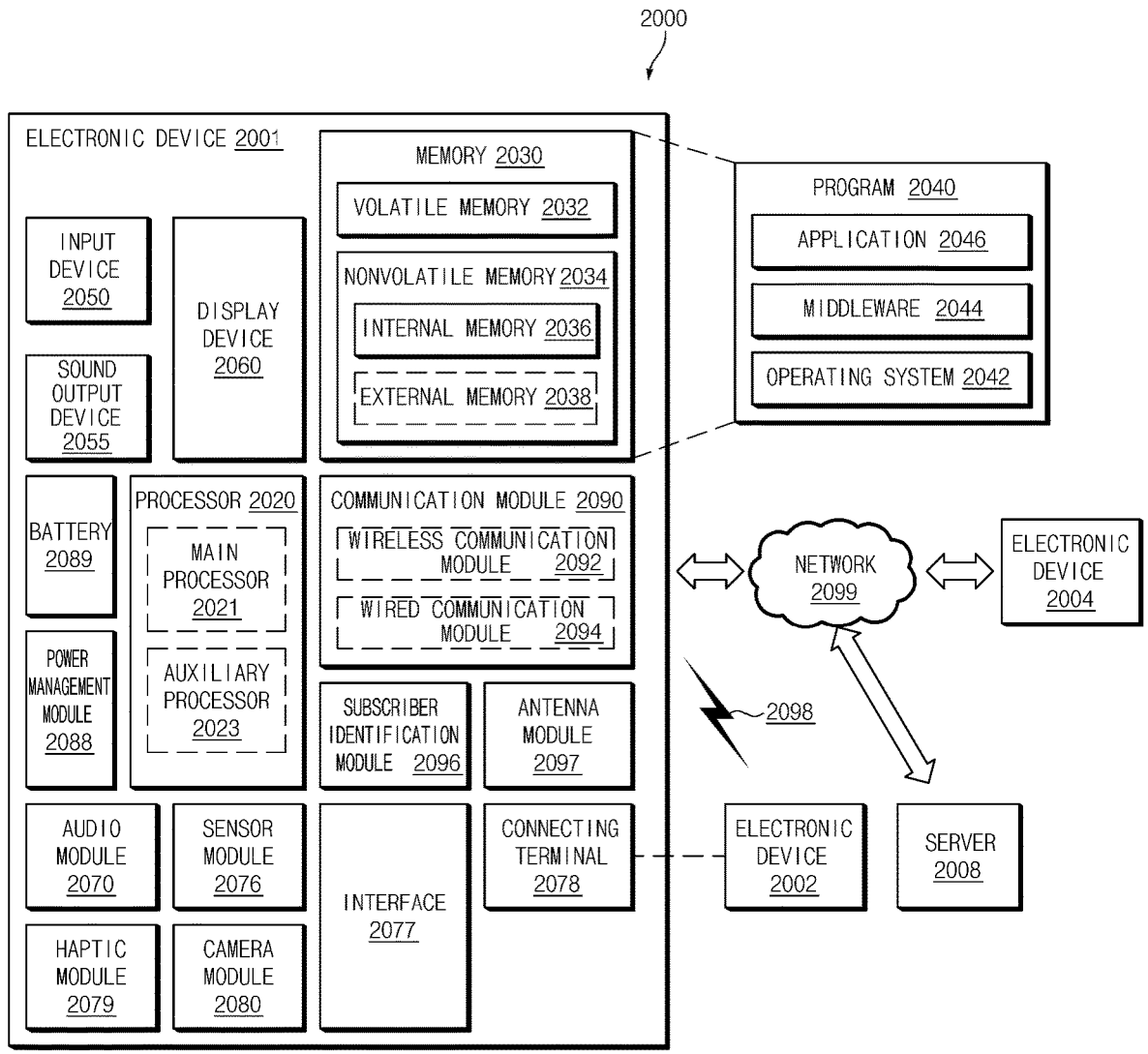
FIG. 8 is a block diagram showing an electronic device for controlling an image display effect in a network environment according to various embodiments.

FIG. 8 is a block diagram showing an electronic device 2001 (e.g., the electronic device 101 shown in FIG. 1) for controlling an image display effect in a network environment 2000 according to various embodiments. Referring to FIG. 8, the electronic device 2001 (e.g., the electronic device 101 shown in FIG. 1) may communicate with an electronic device 2002 via a first network 2098 (e.g., a short-range wireless communication) or may communicate with an electronic device 2004 or a server 2008 via a second network 2099 (e.g., a long-distance wireless communication) in the network environment 2000. According to an embodiment, the electronic device 2001 may communicate with the electronic device 2004 via the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, and an antenna module 2097. According to an embodiment, at least one component (e.g., the display device 2060 or the camera module 2080) among the components of the electronic device 2001 may be omitted, or other components may be added to the electronic device 2001. According to an embodiment, some components may be integrated and implemented as in the case of the sensor module 2076 (e.g., a fingerprint sensor, an iris sensor, or an illuminance sensor) embedded in the display device 2060 (e.g., a display).

The processor 2020 may operate, for example, software (e.g., a program 2040) to control at least one of other components (e.g., hardware or software components) of the electronic device 2001 connected to the processor 2020 and may process and compute a variety of data. The processor 2020 may load an instruction or data, which is received from other components (e.g., the sensor module 2076 or the communication module 2090), into a volatile memory 2032, may process the loaded instruction or data, and may store result data into a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which operates independently from the main processor 2021, additionally or alternatively uses less power than the main processor 2021, or is specified to a designated function. In this case, the auxiliary processor 2023 may operate separately from the main processor 2021 or may be embedded into the main processor 2021.

In this case, the auxiliary processor 2023 may control, for example, at least some of functions or states associated with at least one component (e.g., the display device 2060, the sensor module 2076, or the communication module 2090) among the components of the electronic device 2001 instead of the main processor 2021 while the main processor 2021 is in an inactive (e.g., sleep) state or together with the main processor 2021 while the main processor 2021 is in an active (e.g., an application execution) state. According to an embodiment, the auxiliary processor 2023 (e.g., the image signal processor or the communication processor) may be implemented as a part of another component (e.g., the camera module 2080 or the communication module 2090) that is functionally related to the auxiliary processor 2023. The memory 2030 may store a variety of data used by at least one component (e.g., the processor 2020 or the sensor module 2076) of the electronic device 2001, for example, software (e.g., the program 2040) and input data or output data with respect to instructions associated with the software. The memory 2030 may include the volatile memory 2032 or the nonvolatile memory 2034.

The program 2040 may be stored in the memory 2030 as software and may include, for example, an operating system 2042, a middleware 2044, or an application 2046.

The input device 2050 may be a device for receiving an instruction or data, which is used for a component (e.g., the processor 2020) of the electronic device 2001, from an outside (e.g., a user) of the electronic device 2001 and may include, for example, a microphone, a mouse, or a keyboard.

The sound output device 2055 may be a device for outputting a sound signal to the outside of the electronic device 2001 and may include, for example, a speaker used for general purposes, such as multimedia play or recordings play, and a receiver used only for receiving calls. According to an embodiment, the receiver and the speaker may be either integrally or separately implemented.

The display device 2060 (e.g., the display 110 shown in FIG. 1) may be a device for visually presenting information to the user and may include, for example, a display, a hologram device, or a projector and a control circuit for controlling a corresponding device. According to an embodiment, the display device 2060 may include a touch circuitry or a pressure sensor for measuring an intensity of pressure on the touch.

The audio module 2070 may convert a sound and an electrical signal in dual directions. According to an embodiment, the audio module 2070 may obtain the sound through the input device 2050 or may output the sound through the sound output device 2055 or an external electronic device (e.g., the electronic device 2002 (e.g., a speaker or a headphone)) wired or wirelessly connected to the electronic device 2001.

The sensor module 2076 may generate an electrical signal or a data value corresponding to an operating state (e.g., power or temperature) inside or an environmental state outside the electronic device 2001. The sensor module 2076 may include, for example, a gesture sensor, a gyro sensor, a pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2077 may support a designated protocol wired or wirelessly connected to the external electronic device (e.g., the electronic device 2002). According to an embodiment, the interface 2077 may include, for example, an HDMI (high-definition multimedia interface), a USB (universal serial bus) interface, an SD card interface, or an audio interface.

A connection terminal 2078 may include a connector that physically connects the electronic device 2001 to the external electronic device (e.g., the electronic device 2002), for example, an HDMI connector, a USB connector, an SD card connector, or an audio connector (e.g., a headphone connector).

The haptic module 2079 may convert an electrical signal to a mechanical stimulation (e.g., vibration or movement) or an electrical stimulation perceived by the user through tactile or kinesthetic sensations. The haptic module 2079 may include, for example, a motor, a piezoelectric device, or an electric stimulator.

The camera module 2080 (e.g., the first camera 151 or the second camera 152 shown in FIG. 1) may take a still image or a video image. According to an embodiment, the camera module 2080 may include, for example, at least one lens, an image sensor, an image signal processor, or a flash.

The power management module 2088 may be a module for managing power supplied to the electronic device 2001 and may serve as at least a part of a power management integrated circuit (PMIC).

The battery 2089 may be a device for supplying power to at least one component of the electronic device 2001 and may include, for example, a non-rechargeable (primary) battery, a rechargeable (secondary) battery, or a fuel cell.

The communication module 2090 may establish a wired or wireless communication channel between the electronic device 2001 and the external electronic device (e.g., the electronic device 2002, the electronic device 2004, or the server 2008) and support communication execution through the established communication channel. The communication module 2090 may include at least one communication processor operating independently from the processor 2020 (e.g., the application processor) and supporting the wired communication or the wireless communication. According to an embodiment, the communication module 2090 may include a wireless communication module 2092 (e.g., a cellular communication module, a short-range wireless communication module, or a GNSS (global navigation satellite system) communication module) or a wired communication module 2094 (e.g., an LAN (local area network) communication module or a power line communication module) and may communicate with the external electronic device using a corresponding communication module among them through the first network 2098 (e.g., the short-range communication network such as a Bluetooth, a WiFi direct, or an IrDA (infrared data association)) or the second network 2099 (e.g., the long-distance communication network such as a cellular network, an internet, or a computer network (e.g., LAN or WAN)). The above-mentioned various communication modules 2090 may be implemented into one chip or into separate chips, respectively.

According to an embodiment, the wireless communication module 2092 may identify and authenticate the electronic device 2001 using user information stored in the subscriber identification module 2096 in the communication network.

The antenna module 2097 may include one or more antennas to transmit or receive the signal or power to or from an external source.

According to an embodiment, the communication module 2090 (e.g., the wireless communication module 2092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., an instruction or data) with each other.

According to an embodiment, the instruction or data may be transmitted or received between the electronic device 2001 and the external electronic device 2004 through the server 2008 connected to the second network 2099. Each of the electronic devices 2002 and 2004 may be the same or different types as or from the electronic device 2001. According to an embodiment, all or some of the operations performed by the electronic device 2001 may be performed by another electronic device or a plurality of external electronic devices. When the electronic device 2001 performs some functions or services automatically or by request, the electronic device 2001 may request the external electronic device to perform at least some of the functions related to the functions or services, in addition to or instead of performing the functions or services by itself. The external electronic device receiving the request may carry out the requested function or the additional function and transmit the result to the electronic device 2001. The electronic device 2001 may provide the requested functions or services based on the received result as is or after additionally processing the received result. To this end, for example, a cloud computing, distributed computing, or client-server computing technology may be used.

Figure 9:
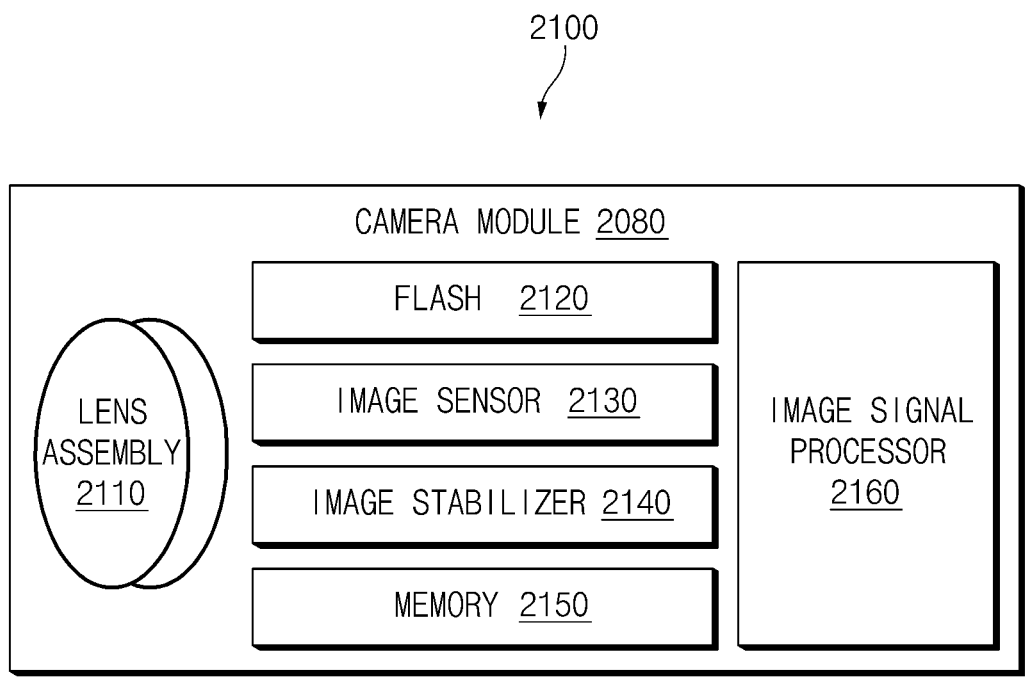
FIG. 9 is a block diagram showing a camera module according to various embodiments.

FIG. 9 is a block diagram 2100 showing a camera module 2080 according to various embodiments. Referring to FIG. 9, the camera module 2080 (e.g., the first camera 151 or the second camera 152 shown in FIG. 1) may include a lens assembly 2110, a flash 2120, an image sensor 2130, an image stabilizer 2140, a memory 2150 (e.g., a buffer memory), and an image signal processor 2160. The lens assembly 2110 may collect a light emitted from a subject that is to be photographed. The lens assembly 2110 may include one or more lenses. According to an embodiment, the camera module 2080 may include a plurality of lens assemblies 2110. In this case, the camera module 2080 may be, for example, a dual-camera, a 360-degree camera, or a spherical camera. The lens assemblies 2110 may have the same lens properties (e.g., an angle of view, a focal length, an auto focus, an f number, an optical zoom, etc.), or at least one lens assembly may have at least one different lens property from other lens assemblies. The lens assembly 2110 may include, for example, a wide-angle lens or a telephoto lens. The flash 2120 may emit a light source used to enhance the light emitted from the subject. The flash 2120 may include one or more light emitting diodes (e.g., an RGB (red-green-blue) LED, a white LED, or an ultraviolet LED) or an xenon lamp.

The image sensor 2130 may convert the light transmitted thereto from the subject through the lens assembly 2110 to an electrical signal to obtain an image corresponding to the subject. According to an embodiment, the image sensor 2130 may include, for example, one image sensor selected from among image sensors having different properties, e.g., an RGB sensor, a black and white (BW) sensor, an IR sensor, a UV sensor, etc., a plurality of image sensors having the same property, or a plurality of image sensors having the different properties from each other. Each image sensor included in the image sensor 2130 may be implemented in, for example, a charged coupled device (CCD) sensor or a complementary metal oxide semiconductor (CMOS) sensor.

Responsive to a movement of the camera module 2080 or the electronic device 2001 including the camera module 2080, the image stabilizer 2140 may move or control (e.g., control a read-out timing) at least one lens included in the lens assembly 2110 or the image sensor 2130 in a specific direction in order to compensate for at least a portion of a negative influence, which is caused by the movement, on the image to be taken. According to an embodiment, the image stabilizer 2140 may be implemented in, for example, an optical-type image stabilizer, and the movement may be sensed by a gyro sensor (not shown) or an acceleration sensor (not shown) located inside or outside the camera module 2180.

The memory 2150 may temporarily store at least a portion of the image obtained through the image sensor 2130 for a next image processing operation. As an example, when an image obtaining operation using a shutter is delayed or a plurality of images is obtained at high speed, the obtained original image (e.g., an image with high resolution) may be stored in the memory 2150, and a copy image (e.g., an image with low resolution) of the obtained image may be previewed through the display device 2060. Then, when a specified condition (e.g., a user's input or a system command) is satisfied, at least a portion of the original image stored in the memory 2150 may be processed, for example, by the image signal processor 2160. According to an embodiment, the memory 2150 may be implemented in at least a portion of the memory 2030 or a separate memory independently operated from the memory 2030.

The image signal processor 2160 may perform an image processing operation (e.g., a depth map generating operation, a three-dimensional modeling operation, a panorama generating operation, a feature point extracting operation, an image synthesizing operation, or an image compensating operation (e.g., noise reduction, resolution control, brightness control, blurring, sharpening, or softening)) on the image obtained through the image sensor 2130 or the image stored in the memory 2150. Additionally or alternatively, the image signal processor 2160 may perform a control operation (e.g., an exposure time control, a read-out timing control, etc.) on at least one component (e.g., the image sensor 2130) among components included in the camera module 2080. The image processed by the image signal processor 2160 may be stored again into the memory 2150 to further process the image or transmitted to external components (e.g., the memory 2030, the display device 2060, the electronic device 2002, the electronic device 2004, or the server 2008) of the camera module 2080. According to an embodiment, the image signal processor 2160 may be implemented in at least a portion of the processor 2020 or a separate processor independently operated from the processor 2020. When the image signal processor 2160 is implemented in the separate processor, the images processed by the image signal processor 2160 may be displayed through the display device 2060 without being further processed or after being further processed by the processor 2020.

According to an embodiment, the electronic device 2001 may include two or more camera modules 2080 having different properties or functions from each other. In this case, at least one camera module 2080 may be a wide-angle camera or a front-facing camera, and at least one other camera module may be a telephoto camera or a rear-facing camera.

According to various embodiments, the electronic device (e.g., the electronic device 101 of FIG. 1 or the electronic device 2001 of FIG. 8) may include the display (e.g., the display 110 of FIG. 1 or the display 2060 of FIG. 8), the memory (e.g., the memory 170 of FIG. 1 or the memory 2030 of FIG. 8), and the processor (e.g., the processor 160 of FIG. 1 or the processor 2020 of FIG. 8). The processor may be configured to identify the first image of the external object, which is obtained by the first camera with the first angle of view, and the second image of the external object, which is obtained by the second camera with the second angle of view, to generate the third image of the external object using the first area including at least the portion of the first image and the second area corresponding to the first area in the second image, to identify the input associated with the third image displayed through the display, and to selectively display the image corresponding to the input in response to the input by using at least one of the first image, the second image, or the depth information. The operation of generating the third image includes generating the depth information with respect to the third image.

According to various embodiments, the processor may be configured to receive the input associated with the depth adjustment with respect to the third image as at least the portion of the input, to determine the blur level corresponding to the input as a portion of the operation of selectively displaying the image, and to blur the portion of the third image depending on the determined blur level.

According to various embodiments, the electronic device (e.g., the electronic device 101 of FIG. 1 or the electronic device 2001 of FIG. 8) may further include the first camera and the second camera, and the processor may be configured to receive the shooting signal with respect to the shooting for the external object, to obtain the first image using the first camera in response to the signal, and to obtain the second image using the second camera in response to the signal.

According to various embodiments, the processor may be configured to store the first image and the second image to be included in one file.

According to various embodiments, the electronic device (e.g., the electronic device 101 of FIG. 1 or the electronic device 2001 of FIG. 8) may include the first camera, the second camera placed to be spaced apart from the first camera with the predetermined distance, the display (e.g., the display 110 of FIG. 1 or the display 2060 of FIG. 8), the memory (e.g., the memory 170 of FIG. 1 or the memory 2030 of FIG. 8), and the processor (e.g., the processor 160 of FIG. 1 or the processor 2020 of FIG. 8). The processor may be configured to obtain the first image data with respect to the external object using the first camera and the second image data with respect to the external object using the second camera, to extract the depth information based on the difference between the first image data and the second image data or the distance, to display the preview image corresponding to the external object, to display a first user interface associated with the control of the display effect corresponding to the preview image, and to update the preview image using at least the display effect determined based on the user's input identified using the first user interface and the depth information. The processor may be configured to blur at least the portion of the preview image based on the user's input and the depth information. The processor may be configured to apply the display effect to the area except for a focus area of the first camera or a focus area of the second camera.

According to various embodiments, the processor may be configured to display the preview image based on at least one of the first image data or the second image data.

According to various embodiments, when the shooting input using the first camera or the second camera occurs, the processor may be configured to store the first image data, the second image data, and the depth information, at the time point at which the shooting input occurs, in the memory.

According to various embodiments, the processor may be configured to generate one file including the first image data, the second image data, and the depth information and to store the generated file in the memory. The processor may be configured to store at least a portion of shoot-setting information of the first camera or shoot-setting information of the second camera in the file. The processor may be configured to store the preview image, to which the display effect is applied, in the memory at the time point at which the shooting input occurs.

According to various embodiments, the processor may be configured to display the representative image based on one of the first image data and the second image data through the display by the application's request associated with the output of the image. The processor may be configured to display a second user interface associated with the control of the display effect corresponding to the representative image and to update the representative image using at least the display effect determined based on the user's input identified using the second user interface and the depth information.

According to various embodiments, the processor may be configured to generate the video file about the process of applying the display effect to the representative image based on the depth information and to store the video file in the memory.

According to various embodiments, the first camera may include the telephoto lens, and the second camera may include the wide-angle lens. Each component (e.g., the module or the program) according to various embodiments may include at least one of the above elements, and a portion of the above sub-components may be omitted, or additional other sub-components may be further included. Alternatively or additionally, some components (e.g., the module or the program) may be integrated in one element and may perform the same or similar functions performed by each corresponding component prior to the integration. Operations performed by a module, a program, or other components according to various embodiments of the present disclosure may be executed sequentially, in parallel, repeatedly, or in a heuristic method. Also, at least some operations may be executed in different sequences, omitted, or other operations may be added.

The invention claimed is:

1. An electronic device comprising:
a first camera having a first angle of view;
a second camera having a second angle of view;
a display;
a memory; and
a processor, wherein the processor is configured to:
obtain a first image obtained by the first camera with respect to an external object, when the first camera is focused on the external object, and a second image obtained by the second camera with respect to the external object;
generate a third image with respect to the external object using a first area of the first image where the external object appears, and a second area of the second image where the external object appears, generating of the third image including generating depth information with respect to the third image, wherein the external object appears in a third area of the third image, and wherein the third image includes a remaining portion excluding the third area;

display the third image together with a first user interface associated with a control of a level of blurring applied to the remaining portion, wherein the first user interface includes a first moveable object;

receive a first user input to move the first moveable object using the first user interface;

determine the level of blurring based on the first user input associated with a depth adjustment, wherein the level of blurring is linearly related to an amount of movement of the first moveable object;

blur the remaining portion of the third image based on the depth information and the level of blurring, thereby resulting in a blurred third image; and display the blurred third image, wherein as a depth difference from the third area increases, a degree of blurring increases in the remaining portion, and wherein, the processor is further configured to:

when a shooting input using the first camera or the second camera occurs, store first image data, second image data, and the depth information at a time point at which the shooting input occurs in the memory, when a gallery application is executed, display a representative image based on the stored first image data and the stored second image data, together with a second user interface associated with a control of a level of blurring applied to the representative image, wherein the second user interface includes a second moveable object.

2. The electronic device of claim 1, wherein the processor is configured to store the first image and the second image in the memory as one file.

3. An electronic device comprising:
a first camera;
a second camera placed to be spaced apart from the first camera with a predetermined distance;
a display;
a memory; and
a processor, wherein the processor is configured to:
obtain first image data with respect to an external object using the first camera, when the first camera is focused on the external object and second image data with respect to the external object using the second camera;

extract depth information based on a difference between the first image data and the second image data;

display a preview image corresponding to the external object, wherein the external object appears in a focused area of the preview image, and wherein the preview image includes a remaining portion excluding the focused area;

display the preview image together with a first user interface associated with a control of a level of effect applied to the remaining portion, wherein the first user interface includes a first moveable object;

determine the level of blurring based on a first user input identified using the first user interface and the depth information, wherein the level of blurring is linearly related to an amount of movement of the first moveable object; and apply the level of blurring to the remaining portion of the preview image, wherein as a depth difference from the focused area increases, the level of blurring increases in the remaining portion, wherein, the processor is further configured to:

when a shooting input using the first camera or the second camera occurs, store the first image data, the second image data, and the depth information at a time point at which the shooting input occurs in the memory, when a gallery application is executed, display a representative image based on the stored first image data and the stored second image data, together with a second user interface associated with a control of a level of blurring applied to the representative image, wherein the second user interface includes a second moveable object.

4. The electronic device of claim 3, wherein the processor is configured to display the preview image based on at least one of the first image data or the second image data.

5. The electronic device of claim 3, wherein the processor is configured to:
generate one file including the first image data, the second image data, and the depth information; and
store the generated file in the memory.

6. The electronic device of claim 5, wherein the processor is configured to store at least a portion of shoot-setting information of the first camera or shoot-setting information of the second camera in a file.

7. The electronic device of claim 3, wherein the processor is configured to store the preview image to which a display effect is applied in the memory at the time point at which the shooting input occurs.

8. The electronic device of claim 3, wherein the processor is configured to:
determine the level of blurring of the representative image based on a second user input to move the second moveable object, wherein the level of blurring of the representative image is linearly related to an amount of movement of the second moveable object;
blur the representative image based on the level of blurring and the depth information.

9. A method of displaying an image in an electronic device, the method comprising:
obtaining a first image obtained by a first camera with respect to an external object, when the first camera is focused on the external object, and a second image obtained by a second camera with respect to the external object;

generating a third image with respect to the external object using a first area of the first image where the external object appears, and a second area of the second image where the external object appears, wherein the external object appears in a third area of the third image, and wherein the third image includes a remaining portion excluding the third area;

generating depth information with respect to the third image;

displaying the third image together with a first user interface associated with a control of a level of blurring applied to the remaining portion, wherein the first user interface includes a first moveable object;

receiving a first user input to move the first moveable object using the first user interface;

determining the level of blurring based on the first user input associated with a depth adjustment, wherein the level of blurring is linearly related to an amount of movement of the first moveable object;

blurring the remaining portion of the third image based on the depth information and the level of blurring, thereby resulting in a blurred third image; and displaying the blurred third image, wherein as a depth difference from the third area increases, a degree of blurring increases in the remaining portion, wherein the method further comprising:

when a shooting input using the first camera or the second camera occurs, storing first image data, second image data, and the depth information at a time point at which the shooting input occurs in-memory, and when a gallery application is executed, displaying a representative image based on the stored first image data and the stored second image data, together with a second user interface associated with a control of a level of blurring applied to the representative image, wherein the second user interface includes a second moveable object.

* * * * *